United States Patent
Chen

(10) Patent No.: US 10,607,399 B2
(45) Date of Patent: Mar. 31, 2020

(54) HEAD-MOUNTED DISPLAY SYSTEM, METHOD FOR ADAPTIVELY ADJUSTING HIDDEN AREA MASK, AND COMPUTER READABLE MEDIUM

(71) Applicant: HTC Corporation, Taoyuan (TW)

(72) Inventor: Jiun-Lin Chen, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/939,275

(22) Filed: Mar. 29, 2018

(65) Prior Publication Data

US 2018/0336719 A1 Nov. 22, 2018

Related U.S. Application Data

(60) Provisional application No. 62/509,198, filed on May 22, 2017.

(51) Int. Cl.
*G06T 15/40* (2011.01)
*H04N 13/383* (2018.01)
*H04N 13/332* (2018.01)
*H04N 13/128* (2018.01)
*G06F 3/01* (2006.01)

(52) U.S. Cl.
CPC .............. *G06T 15/40* (2013.01); *G06F 3/013* (2013.01); *H04N 13/128* (2018.05); *H04N 13/332* (2018.05); *H04N 13/383* (2018.05); *H04N 2213/002* (2013.01)

(58) Field of Classification Search
None
See application file for complete search history.

(56) References Cited

U.S. PATENT DOCUMENTS

| | | | |
|---|---|---|---|
| 6,466,206 B1 | 10/2002 | Deering | |
| 9,916,690 B2 * | 3/2018 | Nobori | G06T 19/006 |
| 2002/0060648 A1 * | 5/2002 | Matsui | G06F 3/011 |
| | | | 345/8 |
| 2003/0184561 A1 * | 10/2003 | Vorst | G09B 9/30 |
| | | | 345/619 |
| 2008/0285887 A1 * | 11/2008 | Wanda | G06T 15/503 |
| | | | 382/284 |
| 2012/0134543 A1 | 5/2012 | Fedorovskaya et al. | |

(Continued)

FOREIGN PATENT DOCUMENTS

EP 3236306 10/2017

OTHER PUBLICATIONS

Search Report IP.Com.*

(Continued)

*Primary Examiner* — Mohammad J Rahman
(74) *Attorney, Agent, or Firm* — JCIPRNET

(57) ABSTRACT

The disclosure proposes a head-mounted display system, a method for adaptively adjusting a hidden area mask, and a computer program product. The method includes: displaying a plurality of first content to an eye of a wearer of the head mounted display system, wherein the first content is masked by a first hidden area mask; capturing a plurality of first eye images of the eye and obtaining an eyesight of the eye based on the first eye images; adjusting the first hidden area mask to be a second hidden area mask based on the eyesight of the eye; and displaying a second content to the eye, wherein the second content is masked by the second hidden area mask.

9 Claims, 4 Drawing Sheets

(56) References Cited

U.S. PATENT DOCUMENTS

| | | | |
|---|---|---|---|
| 2014/0191928 A1* | 7/2014 | Kobayashi | G02B 27/0172 |
| | | | 345/8 |
| 2014/0268356 A1 | 9/2014 | Bolas et al. | |
| 2015/0235427 A1* | 8/2015 | Nobori | G06T 19/006 |
| | | | 345/629 |
| 2016/0364012 A1* | 12/2016 | Govezensky | G06F 3/0304 |
| 2017/0076425 A1* | 3/2017 | Folse | G02B 27/0179 |
| 2017/0289623 A1* | 10/2017 | Bailey | G06F 3/011 |
| 2018/0190090 A1* | 7/2018 | Ardo | G08B 13/19682 |
| 2018/0293041 A1* | 10/2018 | Harviainen | G06F 3/147 |
| 2019/0073025 A1* | 3/2019 | Schmidt | G06T 7/194 |
| 2019/0143989 A1* | 5/2019 | Oba | G06K 9/00604 |

OTHER PUBLICATIONS

"Search Report of Europe Counterpart Application", dated Oct. 2, 2018, p. 1-p. 6.

Michael Stengel et al., "Adaptive Image-Space Sampling for Gaze-Contingent Real-time Rendering", Computer graphics forum, Jul. 1, 2016, pp. 129-139.

Martin Weier et al., "Foveated Real-Time Ray Tracing for Head-Mounted Displays", Computer Graphics Forum, Oct. 27, 2016, pp. 289-298.

Brian Guenter et al., "Foveated 3D Graphics", ACM Teansactions on Graphics, Nov. 1, 2012, pp. 1.

Ajoy S Fernandes et al., "Combating VR Sickness through Subtle Dynamic Field-Of-View Modification", IEEE Symposium on 3D User Interfaces, Mar. 1, 2016, pp. 201-210.

* cited by examiner

HEAD-MOUNTED DISPLAY SYSTEM, METHOD FOR ADAPTIVELY ADJUSTING HIDDEN AREA MASK, AND COMPUTER READABLE MEDIUM

CROSS-REFERENCE TO RELATED APPLICATION

This application claims the priority benefit of U.S. provisional application Ser. No. 62/509,198, filed on May 22, 2017. The entirety of the above-mentioned patent application is hereby incorporated by reference herein and made a part of specification.

BACKGROUND OF THE INVENTION

1. Field of the Invention

The present invention generally relates to a wearable device and an operating method thereof, in particular, to a head-mounted display system, a method for adaptively adjusting a hidden area mask, and a computer program product.

2. Description of Related Art

Displays with virtual image generation are often used in display devices which are located close to the eyes, so-called near-to-eye displays. Such display devices are known, for example, as head mounted displays (HMD).

An HMD is a display device that a person wears on the head in order to have video information directly displayed in front of the eyes. HMDs are also known as near-to-eye displays. An HMD has either one or two small LCD or OLED displays with magnifying lenses and other optical elements. The displays and optics are typically embedded in a helmet, glasses, or a visor, which a user can wear. Lenses and other optical components are used to give the user the perception that the images are coming from a greater distance, to prevent eyestrain. In HMDs that use a single display, the image is typically projected through optics that split the image into two images, and redirects each image to the respective eye. With two displays, the HMD can show stereoscopic images. The stereoscopic images attempt to create depth in the images by simulating the angular difference between the images viewed by each eye when looking at an object, due to the different positions of the eyes. This angular difference is one of the key parameters the human brain uses in processing images to create depth perception or distance in human vision.

For providing users with great virtual reality (VR) experiences, the HMD are designed to display contents (e.g., images, videos, or scenes) with high resolutions and high framerates. However, these features increase the loading of the graphical processing unit (GPU), which makes the HMD must be disposed with a relatively advanced GPU for maintaining the VR experience to the users. Consequently, the price of the HMD becomes unacceptable to many users.

For lowering the price of the HMD, it is important to design a mechanism for reducing the loading of the GPU while maintaining the VR experiences.

SUMMARY OF THE INVENTION

The disclosure proposes a head-mounted display system including an image capturing device, a display, a non-transitory memory, and a processor. The non-transitory memory stores one or more programs. The processor is coupled to the image capturing device, the display, and the non-transitory memory and executes the one or more programs to: control the display to display a first content to an eye of a wearer of the head mounted display system, wherein the first content is masked by a first hidden area mask; control the image capturing device to capture a plurality of first eye images of the eye and obtain an eyesight of the eye based on the first eye images; adjust the first hidden area mask to be a second hidden area mask based on the eyesight of the eye; and control the display to display a second content to the eye, wherein the second content is masked by the second hidden area mask.

The disclosure proposes a method for adaptively adjusting a hidden area mask, adapted to a head-mounted display system. The method includes: displaying a first content to an eye of a wearer of the head mounted display system, wherein the first content is masked by a first hidden area mask; capturing a plurality of first eye images of the eye and obtaining an eyesight of the eye based on the first eye images; adjusting the first hidden area mask to be a second hidden area mask based on the eyesight of the eye; and displaying a second content to the eye, wherein the second content is masked by the second hidden area mask.

The disclosure proposes a computer program product for use in conjunction with head-mounted display system. The computer program product includes a computer readable storage medium and an executable computer program mechanism embedded therein, the executable computer program mechanism comprising instructions for: displaying a first content to an eye of a wearer of the head mounted display system, wherein the first content is masked by a first hidden area mask; capturing a plurality of first eye images of the eye and obtaining an eyesight of the eye based on the first eye images; adjusting the first hidden area mask to be a second hidden area mask based on the eyesight of the eye; and displaying a second content to the eye, wherein the second content is masked by the second hidden area mask.

BRIEF DESCRIPTION OF THE DRAWINGS

The accompanying drawings are included to provide a further understanding of the disclosure, and are incorporated in and constitute a part of this specification. The drawings illustrate embodiments of the invention and, together with the description, serve to explain the principles of the invention.

DESCRIPTION OF THE EMBODIMENTS

Figure 1:
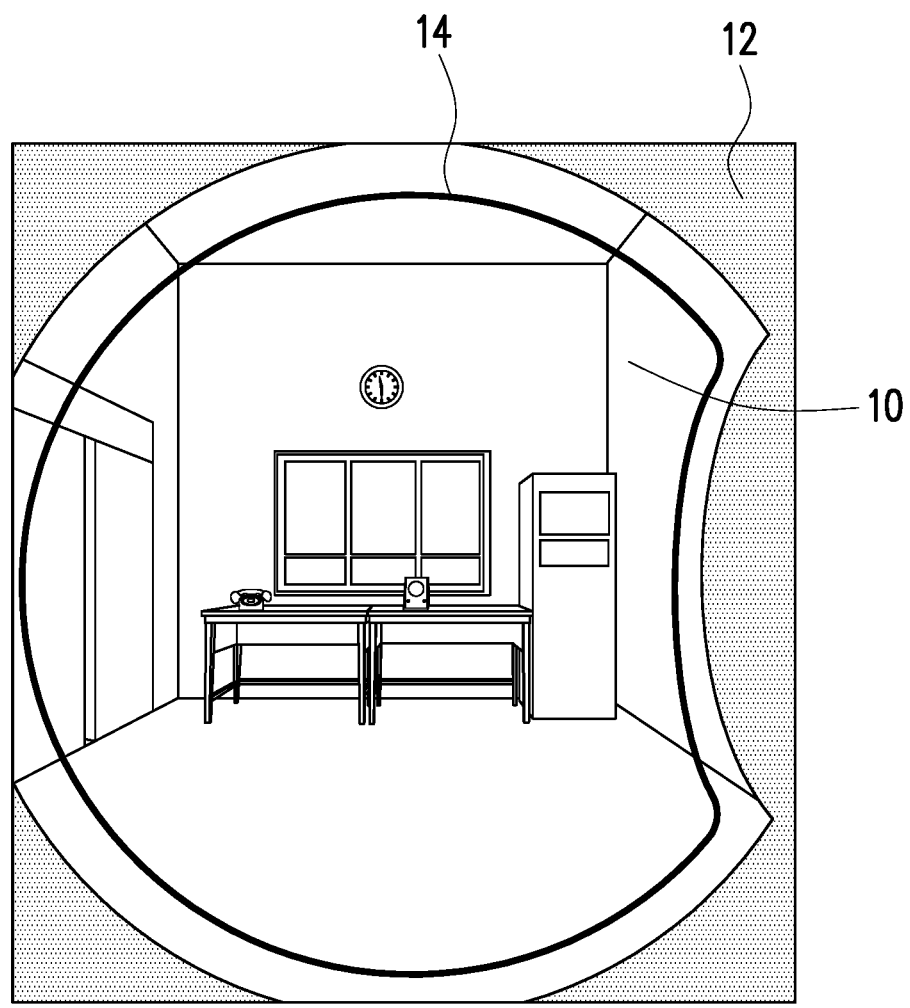
FIG. 1 illustrates a content displayed to an eye of the wearer of an HMD.

Reference will now be made in detail to the present preferred embodiments of the invention, examples of which are illustrated in the accompanying drawings. Wherever possible, the same reference numbers are used in the drawings and the description to refer to the same or like parts.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

As disclosed herein, the term "storage medium", "storage unit" or "computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instinction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

See FIG. 1, which illustrates a content displayed to an eye of the wearer of an HMD. In FIG. 1, the content 10 may be an image, a frame of video, or a scene presented to the left eye of the wearer and may be masked by a hidden area mask 12 (i.e., the illustrated black regions). Conventionally, the hidden area mask is designed to be fixed to eliminate unseen pixels due to lens distortion, which means the size of the visible area provided by the hidden area mask 12 (i.e., the unmasked region of the content 10) is fixed. However, since there are anatomic differences between different users' eyes, the maximum visible areas of the display of the HMD to different wearers should be different as well. That is, the maximum visible area of some users may be smaller than the visible area provided by the hidden area mask 12. As exemplarily shown in FIG. 1, a visible area 14 may be the maximum visible area of the wearer currently wearing the HMD, and the visible area 14 is obviously smaller than the visible area provided by the hidden area mask 12.

Therefore, the present disclosure proposes a method for adaptively adjusting a hidden area mask and an HMD system using the same method, which may adaptively enlarge the hidden area mask to reduce the provided visible area based on the eyesight of the wearer of the HMD system. Since the display of the HMD system may display the subsequent contents with a smaller visible area after the hidden area mask is adaptively enlarged, the loading of the GPU of the HMD system may be reduced.

Figure 2:
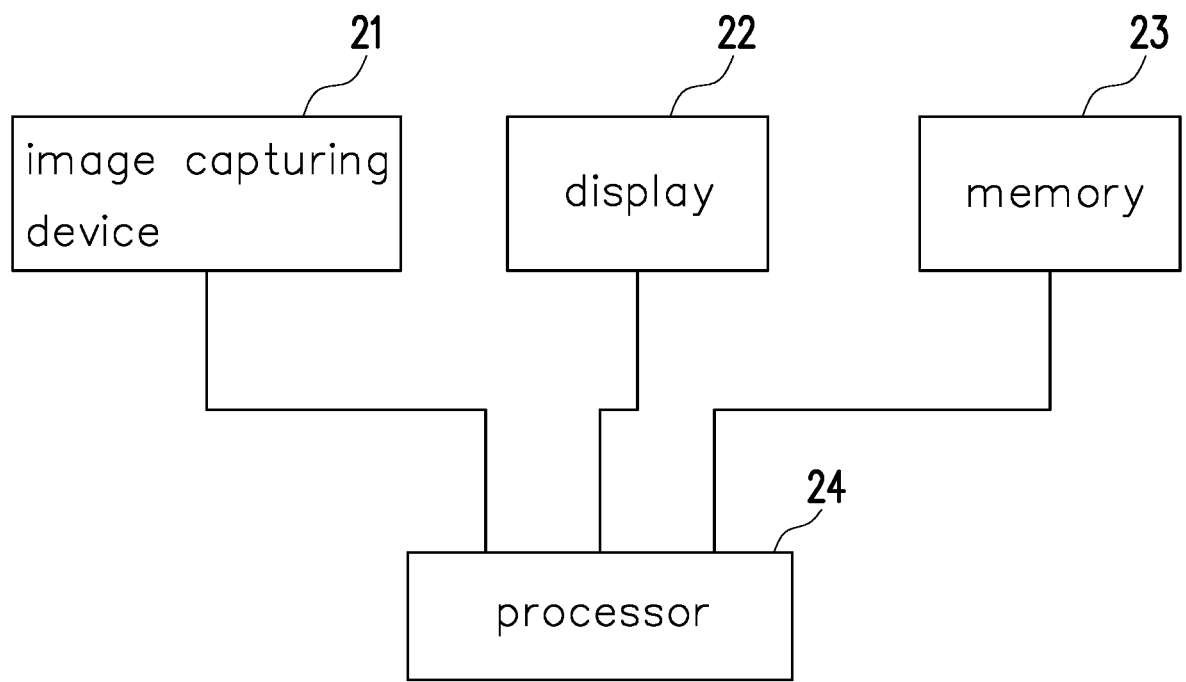
FIG. 2 is a block diagram illustrating an HMD system of one embodiment of the present disclosure.

See FIG. 2, which is a block diagram illustrating an HMD system of one embodiment of the present disclosure. In the present embodiment, an HMD system 200 includes an image capturing device 21, a display 22, a memory 23, and a processor 24.

The image capturing device 21 may be any cameras having charge coupled device (CCD) lens, complementary metal oxide semiconductor transistors (CMOS) lens or infrared lens. Alternatively, the image capturing device 21 could also be image capture equipment being capable of obtaining depth information, such as a depth camera or a stereoscopic camera, but the present disclosure is not limited thereto.

The display 22 could be a liquid crystal display (LCD), a plasma display, a vacuum fluorescent display, a light emitting diode display, a field emission display (FED) and/or other kind of suitable displays, or the electronic devices having the aforementioned displays, but the present disclosure is not limited thereto.

The memory 23 may be one or a combination of a stationary or mobile random access memory (RAM), read-only memory (ROM), flash memory, hard disk, or any other similar device, and which records a plurality of programs or modules that can be executed by the processor 24.

The processor 24 may be coupled to the image capturing device 21, the display 22, and the memory 23. In various embodiments, the processor 24 may be, for example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, an ARM-based processor, and the like.

The processor 24 may access the programs stored in the memory 23 to perform the method for adaptively adjusting a hidden area mask of the present disclosure, and the detailed discussions will be provided hereinafter.

Figure 3:
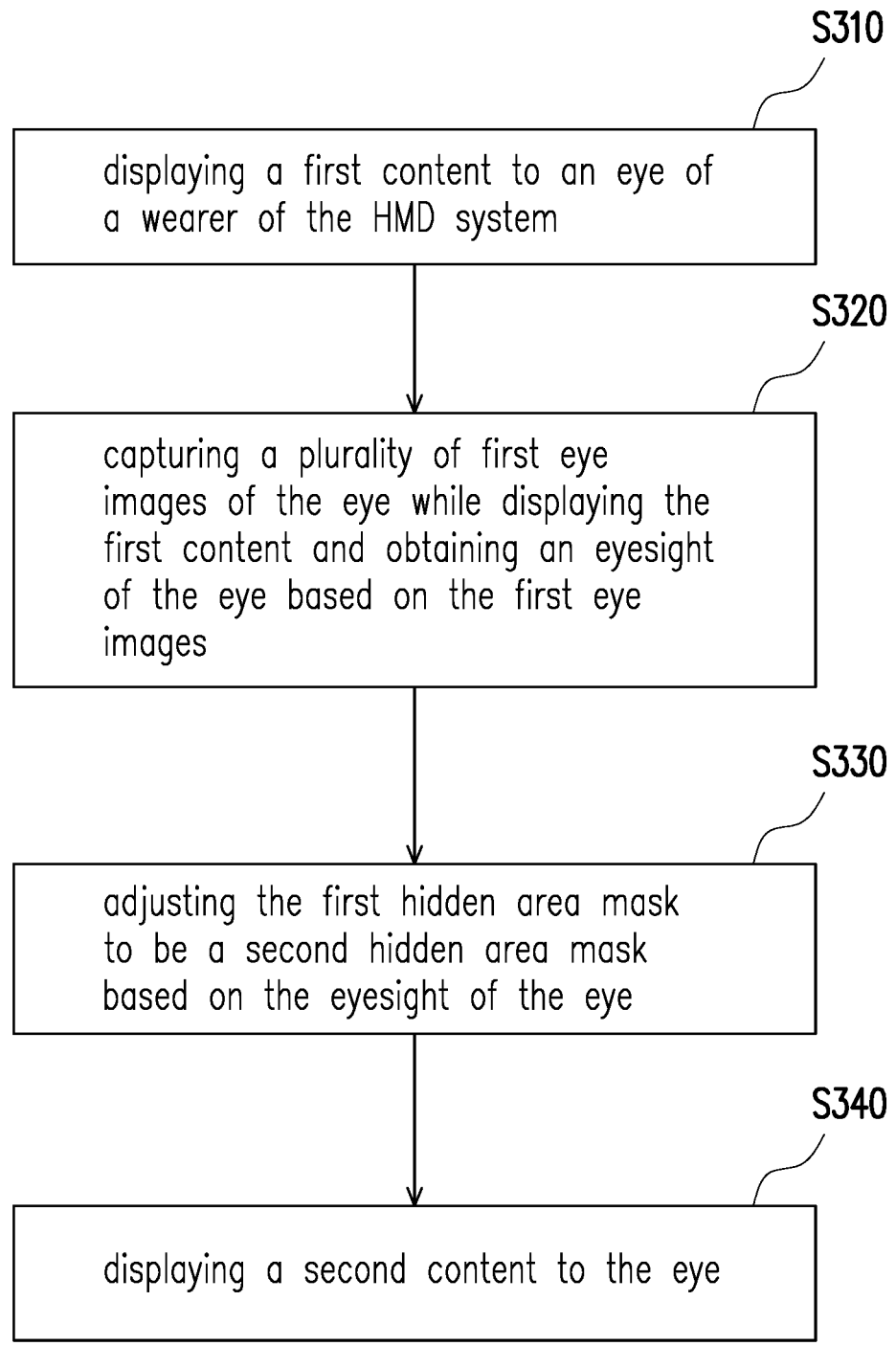
FIG. 3 is a flow chart of the method for adaptively adjusting a hidden area mask of one embodiment of the present disclosure.
Figure 4:
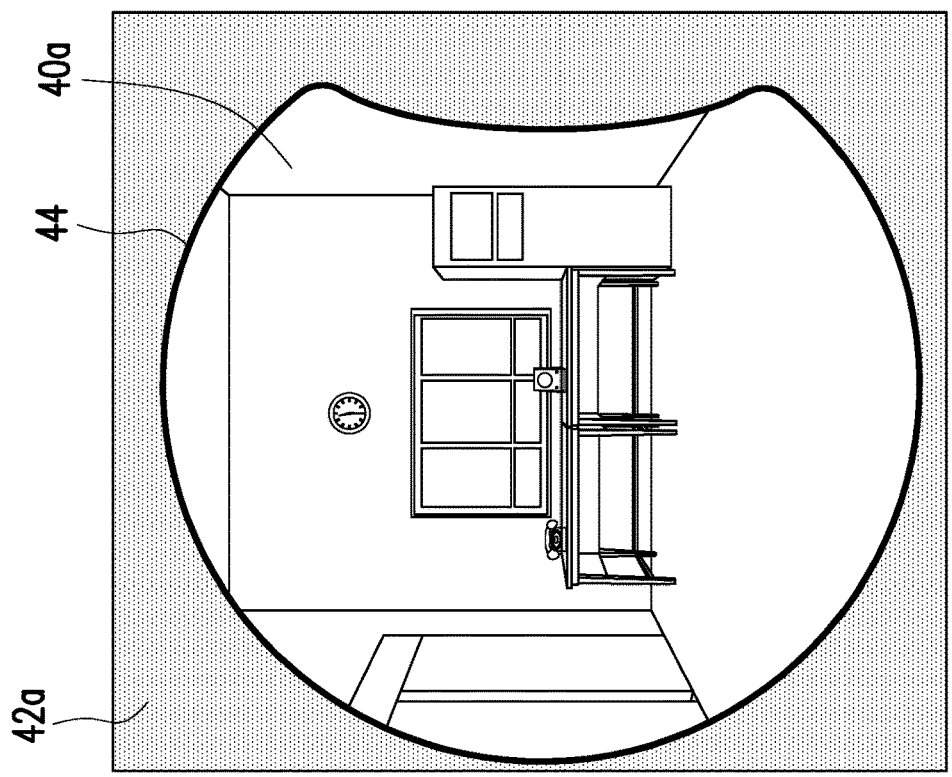
FIG. 4 is a scenario applied with the proposed method of one embodiment of the present disclosure.
Figure 4:
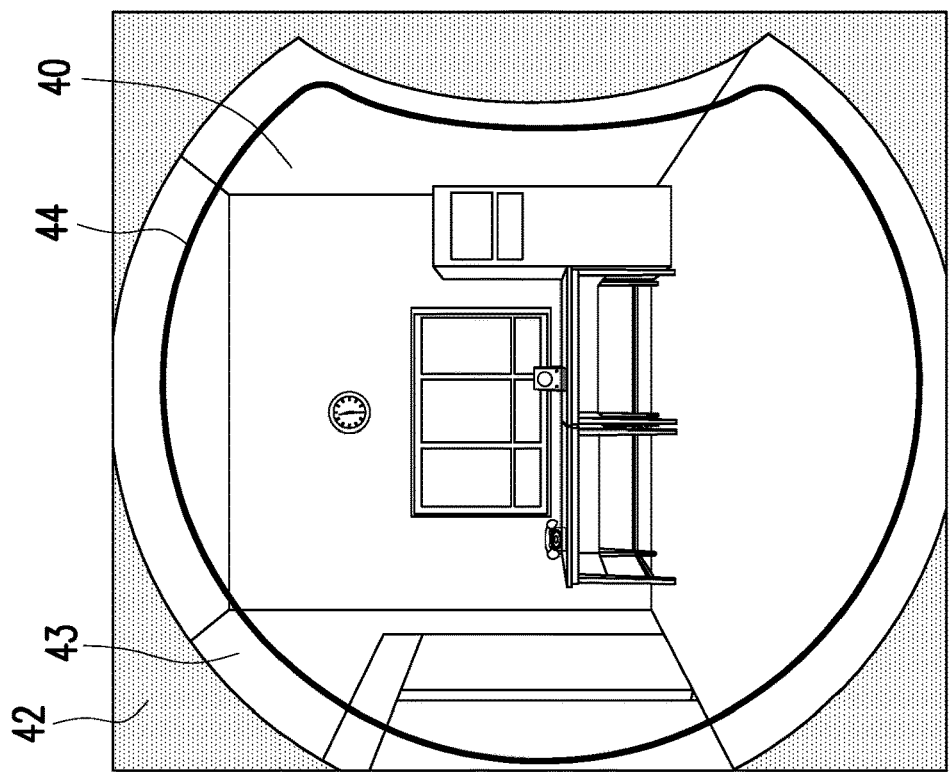

See FIG. 3 and FIG. 4, wherein FIG. 3 is a flow chart of the method for adaptively adjusting a hidden area mask of one embodiment of the present disclosure, and FIG. 4 is a scenario applied with the proposed method of one embodiment of the present disclosure. The method of FIG. 3 could be performed by the HMD system of FIG. 2, and the details of the steps of FIG. 3 will be discussed in accompanying with the elements of FIG. 2 and the scenario illustrated in FIG. 4.

In step S310, the processor 24 controls the display 22 to display a first content 40 to an eye of a wearer of the HMD system 100. In the present embodiment, the first content 40 may be an image, a frame of a video, or a part of a scene presented to one of the eyes of the wearer, and the first content 40 may be masked by a first hidden area mask 42 (i.e., the illustrated black regions) during rendering to reduce GPU computation. That is, the unmasked region of the first content 40 is a first visible area 43 provided by the first hidden area mask 42. For simplicity, the considered eye of the wearer in the following discussions will be assumed to be the left eye of the wearer, but the present disclosure is not limited thereto.

In step S320, the processor 24 controls the image capturing device 21 to capture a plurality of first eye images of the eye while the display 22 displaying the first content 40 and obtains an eyesight of the eye based on the first eye images. In various embodiments, the processor 24 may perform any known eye-tracking algorithms to track the considered eye (e.g., the left eye) of the wearer to obtain the eyesight of the considered eye. In one example, the processor 24 may obtain a plurality of gaze points of the left eye based on the first eye images during a predetermined period and use a range formed by the gaze points to define the eyesight of the left eye, but the present disclosure is not limited thereto.

In FIG. 4, the eyesight of the left eye of the wearer is assumed to be corresponding to a second visible area 44 smaller than the first visible area 43, and the second visible area 44 may be regarded as a maximum visible area of the left eye of the wearer, currently. That is, based on the retrieved eyesight of the left eye of the wearer, the unmasked regions of the content 40 between the second visible area 44 and the first hidden area mask 42 cannot be seen by the left eye of the wearer.

Therefore, in step S330, the processor 24 adjusts the first hidden area mask 42 to be a second hidden area mask 42a based on the eyesight of the eye, and in step S340 the processor 24 controls the display 22 to display a second content 40a to the eye, wherein the second content 40a is masked by the second hidden area mask 42a. In the present embodiment, the second hidden area mask 42a corresponds to the second visible area 44. That is, the unmasked region of the second content 42a corresponds to the second visible area 44 provided by the second hidden area mask 42a.

That is, the proposed method enlarges the first hidden area mask 42 to be the second hidden area mask 42a to mask more portions of the displayed contents. Since the further masked portions of the displayed contents cannot be seen by the considered eye of the wearer in the first place, the loading of the GPU of the HMD system may be reduced for processing less image data without affecting the VR experience provided to the wearers.

Although the second hidden area mask 42a is illustrated to be corresponding to the second visible area 44 (i.e., the maximum visible area of the left eye), in other embodiments, the second hidden area mask may be designed to have another aspect that provides a visible area slightly larger than the second visible area 44 but smaller than the first visible area 43. In this way, when the eyesight of the considered eye accidentally increases for some reasons, the visible area provided by the second hidden area mask may still fit the eyesight of the considered eye.

In some embodiments, the method of FIG. 3 may be recursively performed to repeatedly refine the size of the hidden area mask to better fit the maximum visible area of the considered eye of the wearer.

Specifically, in some embodiments, the processor 24 may control the image capturing device 21 to capture a plurality of second eye images of the eye while the display 22 displaying the second content 42a. Next, the processor 24 may update the eyesight of the eye based on the second eye images and adjust the second hidden area mask 42a to be a third hidden area mask based on the updated eyesight of the eye. Afterwards, the processor 24 may control the display 22 to display a third content to the eye, wherein the third content is masked by the third hidden area mask.

Other hidden masks may be obtained based on the above teachings after the method of FIG. 3 has been recursively performed for several times, and the details will not be further discussed herein.

In some embodiments, if the hidden area mask obtained after the method of FIG. 3 has been repeated for several times are stable, the method of FIG. 3 may be terminated, and the resulted hidden area mask may be used to mask the following contents until the HMD system 100 is turned off.

For example, the processor 24 may determine a similarity between the first hidden area mask 42 and the second hidden area mask 42a. If the similarity is higher than a threshold, the processor 24 may control the display 22 to display other contents to the eye based on the second hidden area mask 42a until the HMD system is turned off.

In one embodiment, the similarity between the first hidden area mask 42 and the second hidden area mask 42a may be obtained by: analysing the pixels commonly covered by the first hidden area mask 42 and the second hidden area mask 42a; and characterizing the percentage that the pixels take part in the second hidden area mask 42a as the similarity. If the similarity is higher than a threshold (e.g., 90%), it represents the second hidden area mask 42a may be stable enough to be applied to the following contents without sabotaging the VR experiences. Hence, the second hidden area mask 42a may be used to mask the following contents to be displayed by the display 22 until the HMD system 100 is turned off. When the HMD system 100 is turned on again, the method of FIG. 3 may be performed again to better fit the visible area of the current wearer.

Since the method of FIG. 3 may be repeatedly performed to sequentially obtain a plurality of hidden area masks, the processor 24 may choose any two of consecutively obtained hidden area masks to calculate the similarity therebetween to determine whether the obtained hidden area masks have been stable enough.

In other embodiments, the processor 24 may determine whether the obtained hidden area masks are stable by analysing the similarities among the hidden area masks. If all of the similarities are higher than a threshold, the hidden area masks may be determined to be stable enough to be applied to the following contents until the HMD system 100 is turned off.

For example, the processor 24 may obtain a first similarity between the first hidden area mask 42 and the second hidden area mask 42a and a second similarity between the second hidden area mask 42a and the third hidden area mask. If the first and the second similarity are higher than a threshold (e.g., 95%), the hidden area masks may be determined to be stable enough, and the third hidden area mask may be applied to the following contents until the HMD system 100 is turned off.

Similarly, since the method of FIG. 3 may be repeatedly performed to sequentially obtain a plurality of hidden area masks, the processor 24 may choose any number of consecutively obtained hidden area masks to calculate the similarities therebetween to determine whether the obtained hidden area masks have been stable enough. In this case, if all of the similarities are higher than the threshold, the hidden area masks may be determined to be stable enough to be applied to the following contents until the HMD system 100 is turned off.

The present invention further provides a computer program product for executing foregoing method for adaptively adjusting a hidden area mask. The computer program product is composed of a plurality of program instructions (for example, a setting program instruction and a deployment program instruction) embodied therein. These program instructions can be loaded into an electronic device and executed by the same to execute the method for adaptively adjusting a hidden area mask and the functions of the electronic device described above.

To sum up, the present disclosure proposes a method for adaptively adjusting a hidden area mask, the HMD system using the same method, and a computer program produce, which may adaptively refine the hidden area mask to adjust the provided visible area based on the eyesight of the wearer of the HMD system. Since the display of the HMD system may display the subsequent contents with a smaller visible area after the hidden area mask is adaptively enlarged, the loading of the HMD system may be reduced, and hence the budget spent on the GPU may be reduced. From another perspective, the developer may have more budgets for 3D scene design and interactions.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A head-mounted display system comprising:
    an image capturing device;
    a display;
    a non-transitory memory storing one or more programs; and
    a processor coupled to the image capturing device, the display, and the non-transitory memory and executing the one or more programs to:
        control the display to display a first content to an eye of a wearer of the head mounted display system, wherein the first content is masked by a first hidden area mask;
        control the image capturing device to capture a plurality of first eye images of the eye while the display displaying the first content and obtain an eyesight of the eye based on the eye images, wherein the processor is configured to:
    obtain a plurality of gaze points of the eye based on the first eye images during a predetermined period; and
        use a range formed by the gaze points to define the eyesight of the eye;
        enlarge the first hidden area mask to be a second hidden area mask based on the eyesight of the eye, wherein an unmasked region of the first hidden area mask corresponds to a first visible area, an unmasked region of the second hidden area mask corresponds to a second visible area, the second visible area is smaller than the first visible area, and the second visible area is not smaller than a maximum visible area of the eye of the wearer; and
    control the display to display a second content to the eye, wherein the second content is masked by the second hidden area mask, wherein the processor is further configured to:

determine a similarity between the first hidden area mask and the second hidden area mask; and if the similarity is higher than a threshold, control the display to display other contents to the eye based on the second hidden area mask until the head-mounted display system is turned off.

2. The head-mounted display system according to claim 1, wherein the second visible area corresponds to the eyesight of the eye.

3. The head-mounted display system according to claim 1, wherein the processor is further configured to:

control the image capturing device to capture a plurality of second eye images of the eye while the display displaying the second content;

update the eyesight of the eye based on the second eye images;

adjust the second hidden area mask to be a third hidden area mask based on the updated eyesight of the eye; and control the display to display a third content to the eye, wherein the third content is masked by the third hidden area mask.

4. The head-mounted display system according to claim 1, wherein if the similarity is not higher than the threshold, the processor is further configured to:

control the image capturing device to capture a plurality of second eye images of the eye while the display displaying the second content;

update the eyesight of the eye based on the second eye images;

adjust the second hidden area mask to be a third hidden area mask based on the updated eyesight of the eye; and control the display to display a third content to the eye, wherein the third content are masked by the third hidden area mask.

5. A method for adaptively adjusting a hidden area mask, adapted to a head-mounted display system, comprising:

displaying a first content to an eye of a wearer of the head mounted display system, wherein the first content is masked by a first hidden area mask;

capturing a plurality of first eye images of the eye while displaying the first content and obtaining an eyesight of the eye based on the first eye images, wherein the step of obtaining the eyesight of the eye based on the eye images comprises:

obtaining a plurality of gaze points of the eye based on the first eye images during a predetermined period; and using a range formed by the gaze points to define the eyesight of the eye;

enlarging the first hidden area mask to be a second hidden area mask based on the eyesight of the eye, wherein an unmasked region of the first hidden area mask corresponds to a first visible area, an unmasked region of the second hidden area mask corresponds to a second visible area, the second visible area is smaller than the first visible area, and the second visible area is not smaller than a maximum visible area of the eye of the wearer; and displaying a second content to the eye, wherein the second content is masked by the second hidden area mask;

determining a similarity between the first hidden area mask and the second hidden area mask; and if the similarity is higher than a threshold, displaying other contents to the eye based on the second hidden area mask until the head-mounted display system is turned off.

6. The method according to claim 5, wherein the second visible area corresponds to the eyesight of the eye.

7. The method according to claim 5, further comprising:

capturing a plurality of second eye images of the eye while displaying the second content;

updating the eyesight of the eye based on the second eye images;

adjusting the second hidden area mask to be a third hidden area mask based on the updated eyesight of the eye; and displaying a third content to the eye, wherein the third content is masked by the third hidden area mask.

8. The method according to claim 5, wherein if the similarity is not higher than the threshold, further comprising:

capturing a plurality of second eye images of the eye while displaying the second content;

updating the eyesight of the eye based on the second eye images;

adjusting the second hidden area mask to be a third hidden area mask based on the updated eyesight of the eye; and displaying a third content to the eye, wherein the third content is masked by the third hidden area mask.

9. A non-transitory computer readable storage medium, recording an executable computer program to be loaded by a head-mounted display system to execute steps of:

displaying a plurality of first content to an eye of a wearer of the head mounted display system, wherein the first content is masked by a first hidden area mask;

capturing a plurality of first eye images of the eye and obtaining an eyesight of the eye based on the first eye images, wherein the step of obtaining the eyesight of the eye based on the eye images comprises:

obtaining a plurality of gaze points of the eye based on the first eye images during a predetermined period; and using a range formed by the gaze points to define the eyesight of the eye;

enlarging the first hidden area mask to be a second hidden area mask based on the eyesight of the eye, wherein an unmasked region of the first hidden area mask corresponds to a first visible area, an unmasked region of the second hidden area mask corresponds to a second visible area, the second visible area is smaller than the first visible area, and the second visible area is not smaller than a maximum visible area of the eye of the wearer; and displaying a plurality of second content to the eye, wherein the second content are masked by the second hidden area mask;

determining a similarity between the first hidden area mask and the second hidden area mask; and if the similarity is higher than a threshold, displaying other contents to the eye based on the second hidden area mask until the head-mounted display system is turned off.

* * * * *